(12) United States Patent
Abe et al.

(10) Patent No.: US 6,990,443 B1
(45) Date of Patent: Jan. 24, 2006

(54) METHOD AND APPARATUS FOR CLASSIFYING SIGNALS METHOD AND APPARATUS FOR GENERATING DESCRIPTORS AND METHOD AND APPARATUS FOR RETRIEVING SIGNALS

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 09/705,069

(22) Filed: Nov. 2, 2000

(30) Foreign Application Priority Data

Nov. 11, 1999 (JP) ............................... P11-321363

(51) Int. Cl.
  *G01L 15/00* (2006.01)
(52) U.S. Cl. ....................................... 704/222; 704/230
(58) Field of Classification Search ................ 704/278, 704/222, 208, 210, 214, 226, 230
See application file for complete search history.

(56) References Cited

U.S. PATENT DOCUMENTS 6,006,179 A * 12/1999 Wu et al. .................... 704/222
6,151,571 A * 11/2000 Pertrushin ................... 704/209
6,236,970 B1 * 5/2001 Imai et al. ................... 704/278
6,316,710 B1 * 11/2001 Lindemann .................. 84/609
6,347,185 B1 * 2/2002 Takahashi et al. ............. 386/95

* cited by examiner

*Primary Examiner*—Daniel Abebe
(74) *Attorney, Agent, or Firm*—Sonnenschein, Nath & Rosenthal LLP

(57) ABSTRACT

The input signal can be quickly and accurately classified and a descriptor can be generated according to the result of classification. Then, the input signal can be retrieved on the basis of the result of classification or the descriptor. A signal processing apparatus comprises a time block splitting section 3 for splitting an audio signal into blocks that are typically 1 second long, a feature extracting section 4 for extracting a characteristic quantity of 18 degrees on the signal attribute from the audio signal in each block and a vector quantizing section 5 for carrying out an operation of categorical classification for the audio signal of each block by means of a vector quantization technique that uses a VQ code book 8 and a characteristic vector formed from the characteristic quantity of 18 degrees. The vector quantizing section 5 outputs a classification label obtained as a result of the categorical classification and a descriptor indicating the reliability of the label. If a signal retrieving operation is conducted in the downstream, the result of the classification or the descriptor is used for the signal retrieval.

6 Claims, 8 Drawing Sheets

METHOD AND APPARATUS FOR CLASSIFYING SIGNALS METHOD AND APPARATUS FOR GENERATING DESCRIPTORS AND METHOD AND APPARATUS FOR RETRIEVING SIGNALS

BACKGROUND OF THE INVENTION

1. Field of the Invention

This invention relates to a method and an apparatus for efficiently classifying pieces of multimedia information such as video signals and audio signals, to a method and an apparatus for generating descriptors (tags) corresponding to the classification and also to a method and an apparatus for retrieving input signals according to the result of the classification or the generated descriptors.

2. Related Background Art

It has been widely recognized that, in order to handle multimedia information such as video signals and audio signals, it is necessary to classify video signals and audio signals according to their contents and put an attribute information (tag) to each signal according to the contents of the signal.

Now, known techniques of classifying signals according to the contents will be briefly discussed in term of audio signals that are popularly used for multimedia information.

Generally, an audio signal comprises sounded spans where sounds exist and soundless spans where no sound exists. Thus, many known techniques adapted to classify the attributes of audio signals that can incessantly change are designed to detect the soundless spans of audio signals. The signal whose soundless spans are detected is tagged to show its soundless spans. Then, the subsequent signal processing operation will be so controlled that the operation is suspended for the soundless spans indicated by the tag.

Meanwhile, Japanese Patent Application Laid-Open No. 10-207491 discloses an audio signal classifying technique that consists in classifying sounds into background sounds and front sounds. With the technique as disclosed in the above patent document, the power and the spectrum of the background sound is estimated and compared with the power and the spectrum of the input signal to isolate background sound spans from front sound spans.

While the technique as disclosed in the above patent document is effective when the input signal is a voice signal and the background sound is a relatively constant and sustained sound, it can no longer correctly classify input signals if they includes ordinary audio signals such as those of music and acoustic signals.

Japanese Patent Application Laid-Open No. 10-187128 discloses a technique of video signal classifying technique of determining the type of picture of the input signals that include auxiliary audio signals such as voice signals and/or music signals on the basis of the sound information accompanying the video information. Thus, with this technique, it is possible to classify audio signals such as voice signals and music signals. According to the disclosed technique, firstly signals showing a predetermined spectrum structure are classified as music signals and removed from the input signals. Then signals showing another spectrum structure are classified as voice signals and removed from the remaining signals.

However, since the technique disclosed in the above patent document regards only spans where the line spectrum structure constantly continues as music signals, it cannot reliably be applied to music signals that contains signals for sounds of percussion instruments and those of a song.

BRIEF SUMMARY OF THE INVENTION

In view of the above described circumstances, it is therefore the object of the present invention to provide a method and an apparatus for efficiently and accurately classifying pieces of multimedia information such as video signals and audio signals, a method and an apparatus for generating tags (descriptors) corresponding to the classification and also a method and an apparatus for retrieving input signals according to the result of the classification or the generated descriptors so that input signals may be processed quickly and accurately.

According to the invention, the above object is achieved by providing a method for classifying signals comprising:
  dividing an input signal into blocks having a predetermined time length;
  extracting one or more than one characteristic quantities of a signal attribute from the signal of each block; and
  classifying the signal of each block into a category according to the characteristic quantities thereof.

In another aspect of the invention, there is provided an apparatus for classifying signals comprising:
  a blocking means for dividing an input signal into blocks having a predetermined time length;
  a feature extracting means for extracting one or more than one characteristic quantities of a signal attribute from the signal of each block; and
  a categorical classifying means for classifying the signal of each block into a category according to the characteristic quantities thereof.

In still another aspect of the invention, there is provided a method for generating descriptors comprising:
  dividing an input signal into blocks having a predetermined time length;
  extracting one or more than one characteristic quantities of a signal attribute from the signal of each block;
  classifying the signal of each block into a category according to the characteristic quantities thereof; and
  generating a descriptor for the signal according to the category of classification thereof.

In a further aspect of the invention, there is provided an apparatus for generating descriptors comprising:
  a blocking means for dividing an input signal into blocks having a predetermined time length;
  a feature extracting means for extracting one or more than one characteristic quantities of a signal attribute from the signal of each block;
  a categorical classifying means for classifying the signal of each block into a category according to the characteristic quantities thereof; and
  a descriptor generating means for generating a descriptor for the signal according to the category of classification thereof.

In a still further aspect of the invention, there is provided method for retrieving input signals comprising:
  dividing an input signal into blocks having a predetermined time length;
  extracting one or more than one characteristic quantities of a signal attribute from the signal of each block;
  classifying the signal of each block into a category according to the characteristic quantities thereof; and
  retrieving the signal according to the result of categorical classification or by using a descriptor generated according to the result of categorical classification.

In still further aspect of the invention, there is provided an apparatus for retrieving input signals comprising:

a blocking means for dividing an input signal into blocks having a predetermined time length;

a feature extracting means for extracting one or more than one characteristic quantities of a signal attribute from the signal of each block;

a categorical classifying means for classifying the signal of each block into a category according to the characteristic quantities thereof; and a signal retrieving means for retrieving the signal according to the result of categorical classification or by using a descriptor generated according to the result of categorical classification.

Thus, according to the invention, a signal that is input continuously for a long period of time is divided into blocks having a predetermined time length and the characteristic quantity of a signal attribute is extracted from the signal of each block so that the signal of the block is automatically classified into a category both according to the characteristic quantity. According to the invention, signals are classified according to the sound sources including voice, music and environmental sound and also according to the sound structures in terms of the sounds found in the block, the way how they overlap each other and the way how they are linked each other without relying on the sound sources of individual sounds such as silence, sounds of single sound sources, those of double sound sources and changing sound sources. Thus, according to the invention, audio signals are classified both according to the sound sources and according to the sound structures to make it possible to reliably and efficiently classify various acoustic scenes that occur successively. Note that the predetermined time length of each block is such a one with which the signal attribute in the block can be clearly identified and the signal structure of the block can be classified in a simple fashion. Preferably, it may be a second, although the predetermined time length of each bock according to the invention is by no means limited to a second and may alternatively have any other appropriate value. Still alternatively, the time length of the block does not necessarily have to have a single value and may be variable from block to block. More specifically, several time lengths may be selectively used or the time length of the block may be made adaptively variable without departing from the scope of the present invention.

As described above, with a method and an apparatus for classifying signals according to the invention, it is possible to classify input signals quickly and accurately by dividing an input signal into blocks having a predetermined time length, extracting the characteristic quantity of a signal attribute from the signal of each block and classifying the signal of each block into a category according to the characteristic quantity thereof. Therefore, it is now possible to classify the type of the sound source and that of the structure of each of the blocks of an audio signal that is a time series signal where various sound sources show various different patterns over a long period of time.

With a method and an apparatus for generating descriptors according to the invention, it is now possible to automatically select an appropriate recognition method and a coding method for any given audio signal by generating a descriptor for the signal according to the category of classification thereof because a specific sound span of the audio signal can be identified and used for a preprocessing operation to be conducted for the purpose of voice recognition or acoustic signal coding to name only a few.

With a method and an apparatus for retrieving input signals according to the invention, for example, the point of switch of sound sources and the classifications of the sound source of an input signal can be retrieved by retrieving the signal so that it is now possible to automatically detect the point of switch of topics or that of television programs and hence multimedia data can be retrieved with ease. Additionally, with a method and an apparatus for retrieving input signals according to the invention, it is now possible to improve the accuracy of detecting a scene change by viewing pictures with a cut change detection feature.

BRIEF DESCRIPTION OF THE SEVERAL VIEWS OF THE DRAWING

FIG. 7 is a schematic block diagram of the function of the vector quantizing means of FIG. 1 to be used when classifying the audio signal of a block as voice, music, environmental sound and so on;

DETAILED DESCRIPTION OF THE INVENTION

Now, the present invention will be described by referring to the accompanying drawings that illustrate preferred embodiments of the invention.

Figure 1:
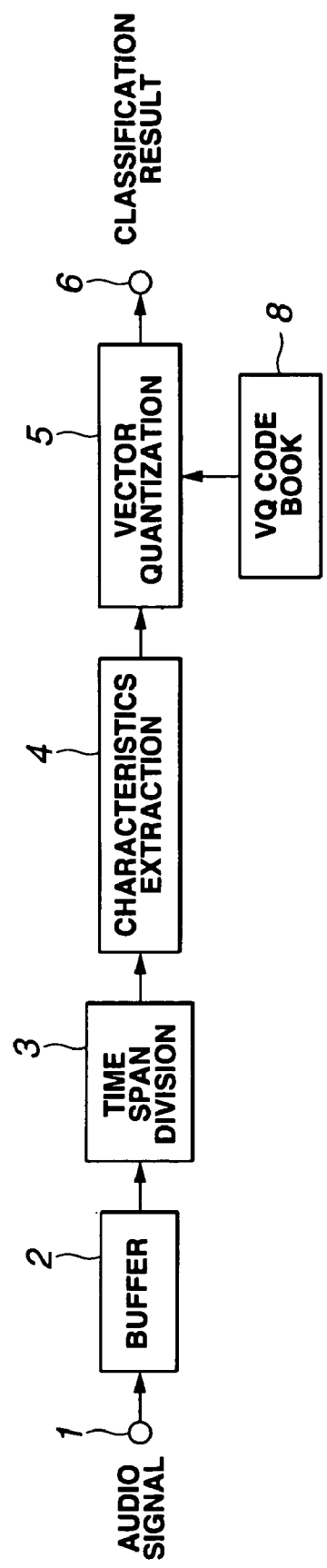
FIG. 1 is a schematic block diagram of a first embodiment of the invention, which is a signal processing an apparatus, schematically illustrating its configuration.

FIG. 1 is a schematic block diagram of a first embodiment of the present invention, which is a signal processing an apparatus adapted to classify input signals (e.g., audio signals), schematically illustrating its configuration.

Referring to FIG. 1, an audio signal is input to input terminal 1 and temporarily stored in buffer memory 2. Subsequently, it is read out and sent to time block splitting section 3.

The time block splitting section 3 divides the audio signal fed from the buffer memory 2 into blocks having a predetermined time length (time block division) and sends the obtained blocks of audio signal to feature extracting section 4. The blocking operation of the time block splitting section 3 will be described in greater detail hereinafter.

The feature extracting section 4 extracts a plurality of characteristic quantities from each block of audio signal and send them to vector quantizing section 5. The processing operation of the feature extracting section 4 for extracting characteristic quantities will be described in greater detail hereinafter.

The vector quantizing section 5 uses a so-called vector quantity technique as will be described in greater hereinafter. It compares the vector (to be referred to as characteristic vector hereinafter) formed by the plurality of characteristic quantities fed from the feature extracting section 4 with a VQ code book (vector quantization code book) 8 containing a set of a plurality of centroids (centers of gravity in a pattern space) generated in advance by learning, searches for the centroid showing a Mahalanobis distance that is closest to said characteristic vector and outputs the representative codes represented by said closest centroid. More specifically, with this embodiment, the representative codes output from the vector quantizing section 5 are the classification label that corresponds to the sound source classification category and the classification label that corresponds to the structural classification category of the audio signal. In other words, the vector quantizing section 5 outputs the result of the operation of classifying the audio signal according to the characteristic vector. In the case of this embodiment, the vector quantizing section 5 is adapted to output the reciprocal of the shortest distance to the above searched centroid as index showing the reliability of the classification of the category along with the above classification label. Then, in this embodiment of the invention, the classification label obtained by the structural classification and its reliability as well as the classification label obtained by the sour source classification and its reliability output from the vector quantizing section 5 are outputs from terminal 6 as signal descriptors representing the result of classification. Referring to FIG. 1, the operation of the time block splitting section 3 for splitting the input audio signal into blocks, that of the feature extracting section 4 for extracting characteristic quantities of the audio signal of each block and that of the vector quantizing section 5 for classifying the audio signal of each block will be described in detail.

Firstly, the operation of the time block splitting section 3 of FIG. 1 for splitting the input audio signal into blocks (time block division) will be discussed.

The time block splitting section 3 is adapted to split an audio signal that is given as various time series sounds and extends over a long period of time into time blocks having an appropriate time length in order to facilitate the subsequent classifying operation.

It will be appreciated that an operation of classifying an audio signal that last for tens of several seconds into a category is impractical and not feasible because the signal can include sounds of various different types and various different sound patterns. On the other hand, the signal pattern that changes with time is essential when classifying sounds and hence it is not feasible to divide an audio signal into signal elements that last only tens of several milliseconds and determines the category to which each signal element belongs, if categories are established in terms of voice/music/noise.

Thus, in this embodiment, the time block splitting section 3 is adapted to split an audio signal into blocks having a time length of 1 second in order to meet the requirements that "the attribute of each signal element produced by splitting an audio signal can be accurately identified" and that "the structure of each signal element produced by splitting an audio signal can be classified in a simple manner".

Figure 2:
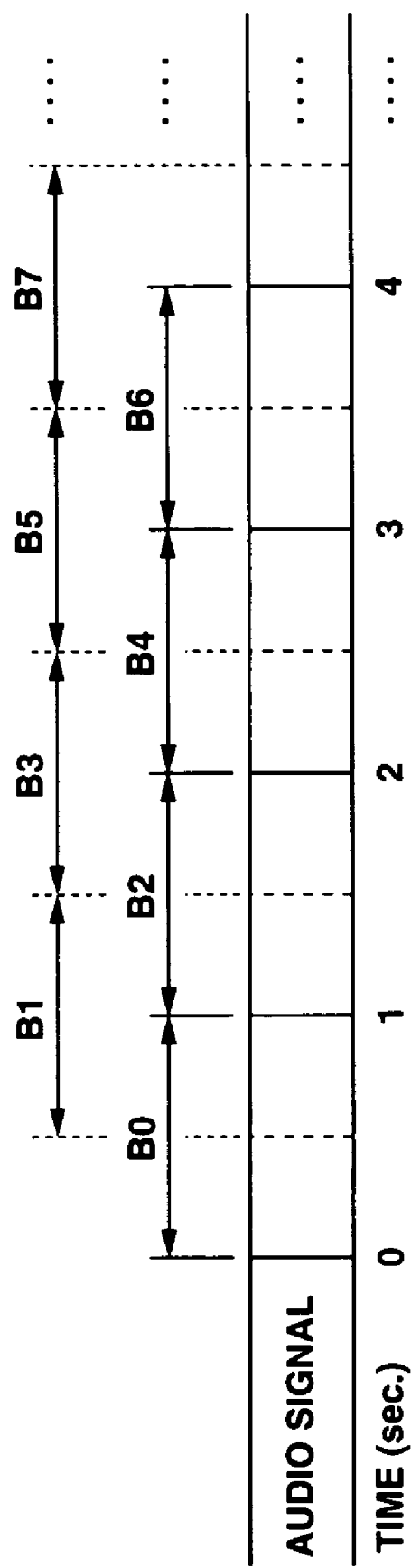
FIG. 2 is a schematic illustration of an operation of blocking an audio signal.

Additionally, in this embodiment, each block is made to overlap an adjacent block by a time length that is equal to a half of that of the block as shown in FIG. 2 in order to enhance the accuracy of the subsequent classifying operation. More specifically, the time block splitting section 3 of this embodiment produces blocks B0, B1, B2, B3, ... having a time length of 1 second and makes the latter half of block B0 overlap the former half of block B1, the latter half of block B1 overlap the former half of block B2, the latter half of block B2 overlap the former half of block B3, the latter half of block B3 overlap the former half of block B4 and so on.

Now, the operation of the feature extracting section 4 of FIG. 1 for extracting characteristic quantities of the signal of each block (feature extraction) will be discussed below.

The feature extracting section 4 is adapted to extract characteristic quantities suitable for the subsequent classifying operation from the signal of each block produced by the time block splitting section 3.

Now, the characteristic quantities of each block extracted by the feature extracting section 4 will be discussed in detail. In the following description, t stands for a variable representing time, T stands for the length of each block (=1 second) and i stands for the block number while $s_i(t)$ stands for the signal of the first block ($0 \leq t \leq T$), $\omega$ stands for a variable representing frequency and $\Omega$ stands for the upper limit of frequency (which is equal to a half of the sampling frequency when the processing operation of the present invention is realized discretely). Furthermore, $S_i(t, w)$ stands for the spectrogram of the signal of the first block ($0 \leq t \leq T$, $0 \leq \omega \leq \Omega$) and E[ ] stands for the average time period of a number of blocks while V[ ] stands for the temporal relative standard deviation of a number of blocks (the value obtained by standardizing the square root of variances with the average).

The feature extracting section 4 computationally determines a total of eighteen (18) characteristic quantities of the signal of each block including the average $P_m$ and the standard deviation $P_{sd}$ of the signal power in the block, the average $W_m$ and the standard deviation $W_{sd}$ of the spread of the spectrogram of the signal in the block, the average $L_m$ and the standard deviation $L_{sd}$ of the power of the low frequency component of the signal in the block, the average $M_m$ and the standard deviation $M_{sd}$ of the power of the intermediate frequency component of the signal in the block, the average $H_m$ and the standard deviation $H_{sd}$ of the power of the high frequency component of the signal in the block, the average $F_m$ and the standard deviation $F_{sd}$ of the pitch frequency of the signal in the block, the average $A_m$ and the standard deviation $A_{sd}$ of the degree of harmonic structurization of the signal in the block, the average $R_m$ and the standard deviation $R_{sd}$ of the LPC (linear predictive analysis) residual energy of the signal in the block and the average $G_m$ and the standard deviation $G_{sd}$ of the pitch gain of the LPC residual signal of the signal in the block.

The average $P_m$ and the standard deviation $P_{sd}$ of the signal power in the block are expressed respectively by formula (1) and (2) below.

$$P_m = E[s^2(t)] \tag{1}$$

$$P_{sd} = V[s^2(t)] \tag{2}$$

The average $W_m$ and the standard deviation $W_{sd}$ of the spread of the spectrogram of the signal in the block are expressed respectively by formula (3) and (4) below. Note that, in this embodiment, a total of five hundreds and twelve (512) samples obtained (by every 31.25 milliseconds) by using a sampling frequency of 16 kHz are used for the spectrum:

$$W_m = E[w(t)] \tag{3 and}$$

$$W_{sd} = V[w(t)] \tag{4}$$

where w (t) is expressed by formula (5) below and represents a frequency width where the spectrogram exceeds a given threshold value. Particularly, the frequency width expressed by the above formula w (t) tends to be wide and constant in the case of music, whereas it does not remain constant and tends to widely vary in the case of voice. Therefore, the frequency width of w (t) can be used as a characteristic quantity of music, voice and other sounds.

$$w(t) = \frac{1}{\Omega} \int_\Gamma d\omega, \Gamma = \{\omega | Si(t, \omega) > \text{Threshold}\} \quad (5)$$

The average $L_m$ and the standard deviation $L_{sd}$ of the power of the low frequency component of the signal in the block are expressed respectively by formula (6) and (7) below. Note that, in this embodiment, a frequency band between 0 and 70 Hz is used for the low frequency component:

$$L_m = E[l(t)] \quad (6) \text{ and}$$

$$L_{sd} = V[l(t)] \quad (7)$$

where l (t) is expressed by formula (8) below and represents the standardized power of the low frequency component of the signal at time t. Particularly, voice practically does not contains any component of 70 Hz and below, whereas the sounds of percussion instruments such as drums normally contain a number of frequency components of 70 Hz and below. Therefore, the low frequency component can be used as a characteristic quantity of music, voice and other sounds.

$$l(t) = \frac{\int_{\omega 0}^{\omega 1} S_i(t, \omega) d\omega}{\int_0^\Omega S_i(t, \omega) d\omega}, (\omega_0 = 0 \text{ Hz}, \omega_1 = 70 \text{ Hz},) \quad (8)$$

The average $M_m$ and the standard deviation $M_{sd}$ of the power of the intermediate frequency component of the signal in the block are expressed respectively by formula (9) and (10) below. Note that, in this embodiment, a frequency band between 70 Hz and 4 kHz is used for the intermediate frequency component:

$$M_m E[m(t)] \quad (9) \text{ and}$$

$$M_{sd} = V[m(t)] \quad (10)$$

where m (t) is expressed by formula (11) below and represents the standardized power of the intermediate frequency component of the signal at time t. Particularly, voice is almost totally contained in the frequency band between 70 Hz and 4 kHz. Therefore, the intermediate frequency component can be used as a characteristic quantity of music, voice and other sounds.

$$m(t) = \frac{\int_{\omega 1}^{\omega 2} S_i(t, \omega) d\omega}{\int_0^\Omega S_i(t, \omega) d\omega}, (\omega_1 = 70 \text{ Hz}, \omega_2 = 4 \text{ kHz},) \quad (11)$$

The average $H_m$ and the standard deviation $H_{sd}$ of the power of the high frequency component of the signal in the block are expressed respectively by formula (12) and (13) below. Note that, in this embodiment, a frequency band between 4 kHz and 8 kHz is used for the high frequency component:

$$H_m = E[h(t)] \quad (12) \text{ and}$$

$$H_{sd} = V[h(t)] \quad (13)$$

where h (t) is expressed by formula (14) below and represents the standardized power of the high frequency component of the signal at time t. Particularly, voice practically does not contains any component of 4 kHz and above, whereas the sounds of percussion instruments such as cymbals normally contain a number of frequency components between 4 kHz and 8 kHz. Therefore, the high frequency component can be used as a characteristic quantity of music, voice and other sounds.

$$h(t) = \frac{\int_{\omega 2}^{\omega 3} S_i(t, \omega) d\omega}{\int_0^\Omega S_i(t, \omega) d\omega}, (\omega_2 = 4 \text{ kHz}, \omega_3 = 8 \text{ kHz},) \quad (14)$$

The average $F_m$ and the standard deviation $F_{sd}$ of the pitch frequency of the signal in the block are expressed respectively by formula (15) and (16) below:

$$F_m = E[f(t)] \quad (15) \text{ and}$$

$$F_{sd} = V[f(t)] \quad (16)$$

where f (t) represents the pitch frequency of the signal at time t, which is typically determined by using Parson's technique (T. Parson: Separation of Speech from Interfering Speech by ms of Harmonic Selection; J. Acoust. Soc. Am., 60, 4, 911/918 (1976). Particularly, the pitch frequency is used for extracting the characteristic quantity of the degree of harmonic structurization as will be described hereinafter and generally differs between music and voice and between male voice and female voice so that it can be used as a characteristic quantity of such sounds.

The average $A_m$ and the standard deviation $A_{sd}$ of the degree of harmonic structurization of the signal in the block (which is expressed by a (t) in this embodiment) are expressed respectively by formula (17) and (18) below:

$$A_m E[a(t)] \quad (17) \text{ and}$$

$$A_{sd} = V[a(t)] \quad (18)$$

where a (t) is expressed by formula (19) below and represents the ratio of the energy of the sound component of integer times of the pitch frequency to the energy of all the frequencies. Additionally, $\Delta$ represents a micro frequency such as ±15 Hz. Particularly, the degree of harmonic structurization is remarkably reduced for noise-like sounds. Therefore, the degree of harmonic structurization can be used as a characteristic quantity of noise-like sounds and other sounds.

$$a(t) = \frac{\int_\Gamma S_i(t, \omega) d\omega}{\int S_i(t, \omega) d\omega}, \quad (19)$$

$$\Gamma = \{\omega | nf(t) - \Delta \leq \omega \leq nf(t) + \Delta, n = 1, 2, \ldots \}$$

The average $R_m$ and the standard deviation $R_{sd}$ of the LPC (linear predictive analysis) residual energy of the signal in the block are expressed respectively by formula (20) and (21) below:

$$R_m = E[r^2(t)]/E[s^2(t)] \tag{20}$$

and $$R_{sd} = V[r^2(t)]/V[s^2(t)] \tag{21}$$

where r (t) represents the residue signal of the LPC analysis (which is typically conducted on the basis of 30 nm frame and 12 degrees). They are quantities of evaluating the complexity of the spectrum structure in the block (in terms of noises and consonants) and determined respectively as ratios relative to average and the standard deviation of the power of the original signal. Therefore the LPC residual energy can be used as characteristic quantity of noises, consonants and other sounds.

The average $G_m$ and the standard deviation $G_{sd}$ of the pitch gain of the LPC residual signal of the signal in the block are expressed respectively by formula (22) and (23) below:

$$G_m = E[g(t)] \tag{22}$$

and $$G_{sd} = V[g(t)] \tag{23}$$

where g (t) represents the maximal value of the short term auto-correlation function at and near time t of r (t) and hence is a quantity of evaluating the degree of periodicity of the residue signal of the LPC analysis (which is typically conducted on the basis of 30 ms frame and 12 degrees) in the block. Particularly, the pitch gain of the LPC residue signal shows a remarkably low value for white noises and consonants, whereas it shows a high value for voice and music. Therefore, the pitch gain of the LPC residual signal can be used as characteristic quantity of noises, consonants, voice, music and other sounds.

In this embodiment, a vector as expressed by formula (24) below is formed by using the above described eighteen characteristic quantities and used as characteristic vector $X_i$ of the block (time block).

$$X_i = [P_m, P_{sd}, W_m, W_{sd}, \ldots G_m, G_{sd}] \tag{24}$$

Figure 3:
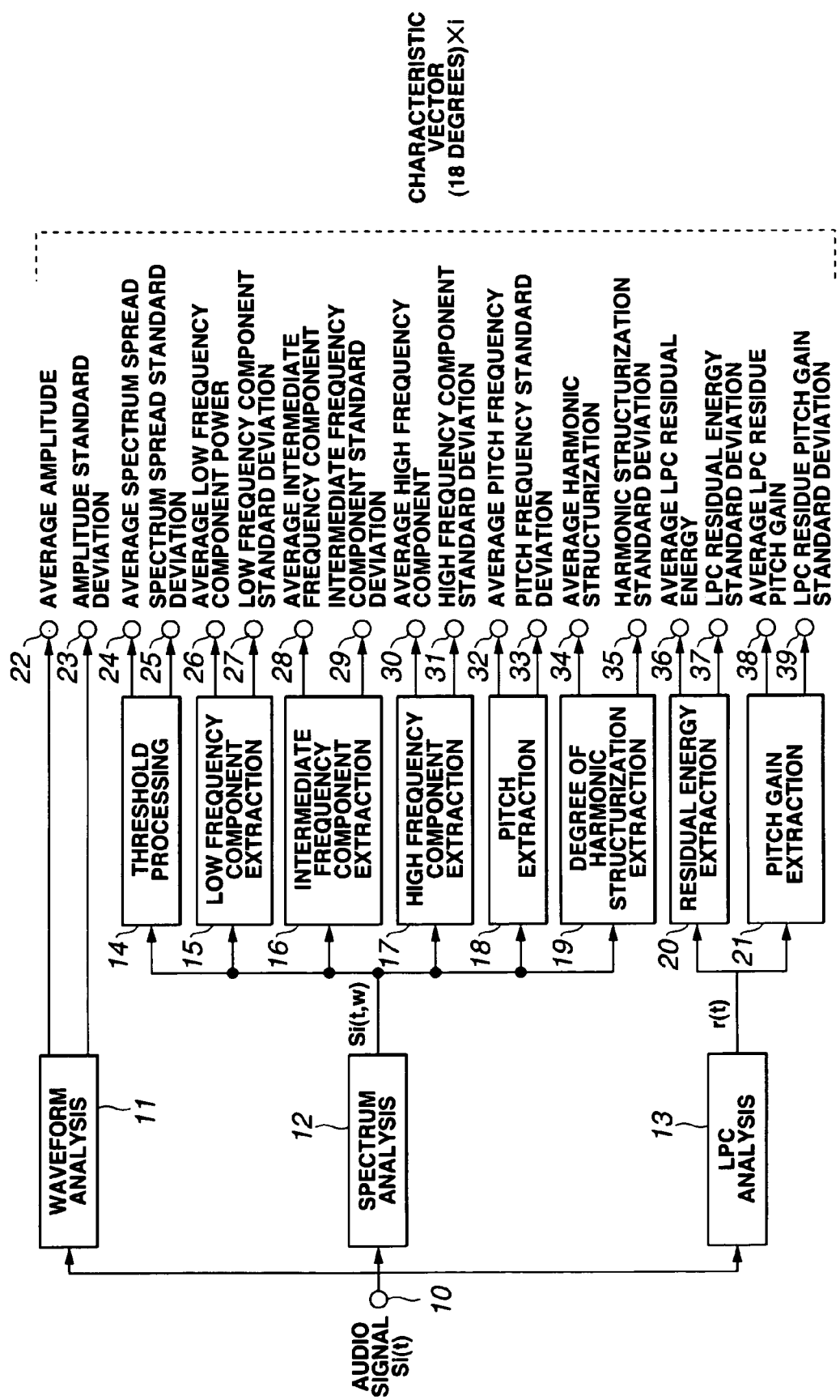
FIG. 3 is a schematic block diagram of the feature extracting means of FIG. 1, illustrating a specific configuration thereof.

FIG. 3 is a schematic block diagram of the feature extracting section 4 of FIG. 1 for determining the above described characteristic vector of 18 degrees, illustrating a specific configuration thereof.

Referring to FIG. 3, the audio signal $s_i$ (t) of the i-th block produced by the time block division of the time block splitting section of FIG. 1 is input to terminal 10. The audio signal $s_i$ (t) of the i-th block is then sent to waveform analysing section 11, spectrum analysing section 12 and LPC analysing section 13.

The waveform analysing section 11 determines the average $P_m$ and the standard deviation $P_{sd}$ of the signal power as described above by referring for formulas (1) and (2) for the audio signal Si (t) of the i-th bock. Then, the average $P_m$ and the standard deviation $p_{sd}$ of the signal power are sent to the downstream vector quantizing section 5 respectively by way of corresponding terminals 22, 23 as two of the characteristic quantities of the vector of eighteen degrees $X_i$.

The spectrum analysing section 12 performs a spectrum analysis operation on the audio signal $s_i$ (t) of the i-th block and generates spectrogram $S_i$ (t,w) of the signal of the i-th block. The spectrogram $S_i$ (t,w) of the signal of the i-th block is then sent to threshold processing section 14, low frequency component extracting section 15, intermediate frequency component extracting section 16, high frequency component extracting section 17, pitch extracting section 18 and degree of harmonic structurization extracting section 19.

The threshold processing section 14 determines the average $W_m$ and the standard deviation $W_{sd}$ of the spread of the spectrogram as described above by referring to formulas (3) and (4), using the spectrogram $S_i$ (t,w) of the signal of the i-th block. Then, the average $W_m$ and the standard deviation $W_{sd}$ of the spread of the spectrogram are sent to the downstream vector quantizing section 5 respectively by way of corresponding terminals 24, 25 as two of the characteristic quantities of the vector of eighteen degrees $X_i$. The low frequency component extracting section 15 determines the average $L_m$ and the standard deviation $L_{sd}$ of the power of the low frequency component as described above by referring to formulas (6) and (7), using the spectrogram $S_i$ (t,w) of the signal of the i-th block. Then, the average $L_m$ and the standard deviation $L_{sd}$ of the power of the low frequency component are sent to the downstream vector quantizing section 5 respectively by way of corresponding terminals 26, 27 as two of the characteristic quantities of the vector of eighteen degrees $X_i$.

The intermediate frequency component extracting section 16 determines the average $M_m$ and the standard deviation $M_{sd}$ of the power of the intermediate frequency component as described above by referring to formulas (9) and (10), using the spectrogram $S_i$ (t,w) of the signal of the i-th block. Then, the average $M_m$ and the standard deviation $M_{sd}$ of the power of the intermediate frequency component are sent to the downstream vector quantizing section 5 respectively by way of corresponding terminals 28, 29 as two of the characteristic quantities of the vector of eighteen degrees $X_i$.

The high frequency component extracting section 17 determines the average $H_m$ and the standard deviation $H_{sd}$ of the power of the high frequency component as described above by referring to formulas (12) and (13), using the spectrogram $S_i$ (t,w) of the signal of the i-th block. Then, the average $H_m$ and the standard deviation $H_{sd}$ of the power of the high frequency component are sent to the downstream vector quantizing section 5 respectively by way of corresponding terminals 30, 31 as two of the characteristic quantities of the vector of eighteen degrees $X_i$.

The pitch extracting section 18 determines the average $F_m$ and the standard deviation $F_{sd}$ of the pitch frequency as described above by referring to formulas (15) and (16), using the spectrogram $S_i$ (t,w) of the signal of the i-th block. Then, the average $F_m$ and the standard deviation $F_{sd}$ of the pitch frequency are sent to the downstream vector quantizing section 5 respectively by way of corresponding terminals 32, 33 as two of the characteristic quantities of the vector of eighteen degrees $X_i$.

The degree of harmonic structurization extracting section 19 determines the average $A_m$ and the standard deviation $A_{sd}$ of the degree of harmonic structurization as described above by referring to formulas (18) and (19), using the spectrogram $S_i$ (t,w) of the signal of the i-th block. Then, the average $A_m$ and the standard deviation $A_{sd}$ of the degree of harmonic structurization are sent to the downstream vector quantizing section 5 respectively by way of corresponding terminals 34, 35 as two of the characteristic quantities of the vector of eighteen degrees $X_i$.

The LPC analysing section 13 performs an operation of LPC analysis on the audio signal $S_i$ (t) of the i-th block and generates residue signal r (t) of the LPC analysis of the i-th block. The generated residue signal r (t) of the LPC analysis is sent to residual energy extracting section 20 and pitch gain extracting section 21.

The residual energy extracting section 20 determines the average $R_m$ and the standard deviation $R_{sd}$ of the residual energy of the LPC analysis as described above by referring to formulas (20) and (21), using the residue signal r (t) of the LPC analysis of the i-th block. Then, the average $R_m$ and the standard deviation $R_{sd}$ of the residual energy of the LPC analysis are sent to the downstream vector quantizing section 5 respectively by way of corresponding terminals 36, 37 as two of the characteristic quantities of the vector of eighteen degrees $X_i$.

The pitch gain extracting section 21 determines the average $G_m$ and the standard deviation $G_{sd}$ of the pitch gain of the LPC analysis as described above by referring to formulas (22) and (23), using the residue signal r (t) of the LPC analysis of the i-th block. Then, the average $G_m$ and the standard deviation $G_{sd}$ of the residual energy of the LPC analysis are sent to the downstream vector quantizing section 5 respectively by way of corresponding terminals 38, 39 as two of the characteristic quantities of the vector of eighteen degrees $X_i$.

Upon receiving the vector of 18 degrees of each block, the vector quantizing section 5 classifies the audio signal of the block on the basis of the vector of 18 degrees, using a vector quantization technique. Now, the classes used for classifying the audio signal of each block will be detailedly discussed below.

For classifying the audio signal of each block with this embodiment, it is classified into a structural class and a sound source class in a manner as described below.

Firstly the structural classes that are used for the purpose of classification of audio signals in this embodiment will be described in detail.

Figure 4:
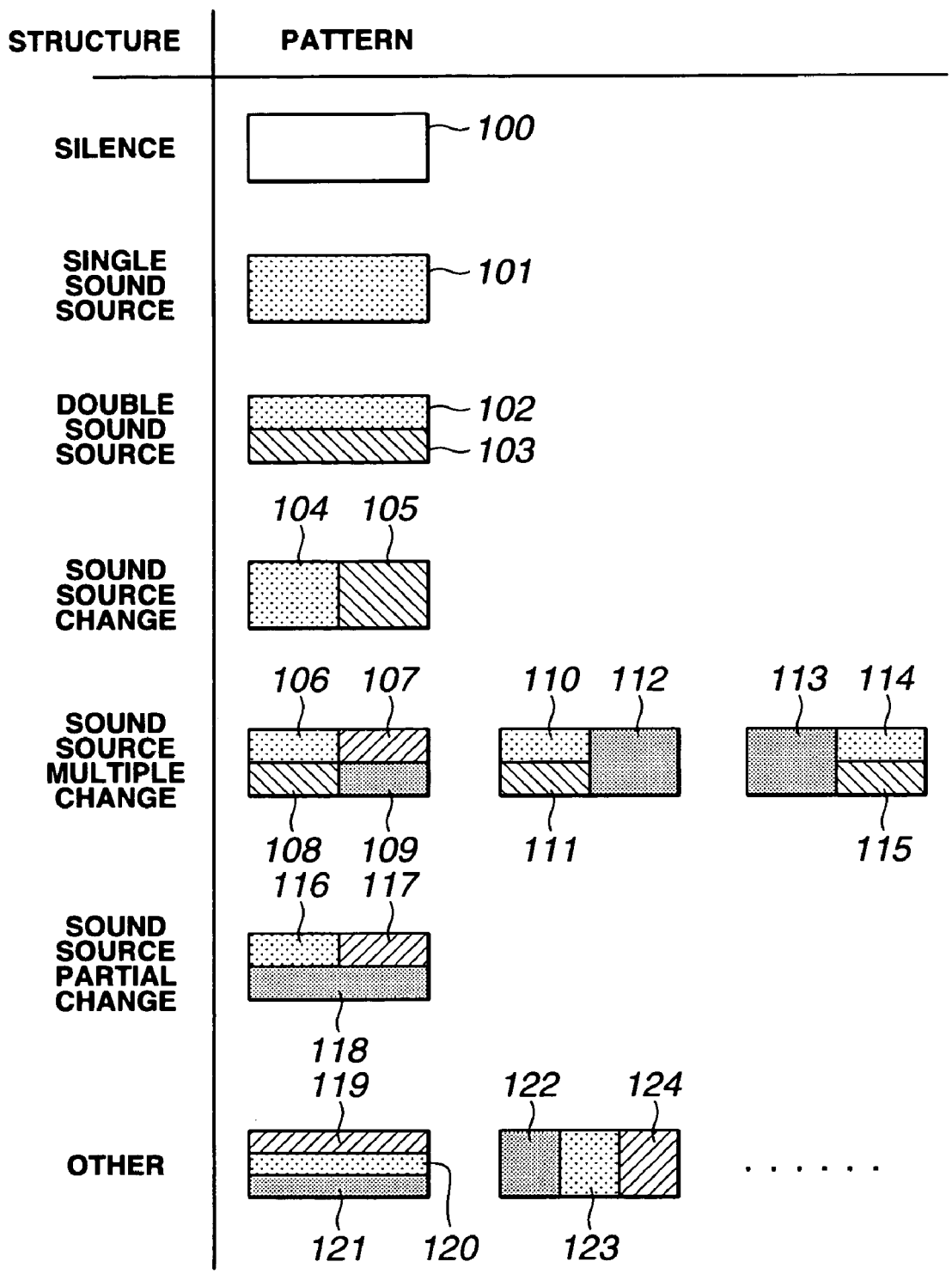
FIG. 4 is a schematic illustration of structural classification categories.

The structural classes refers to an operation of classifying audio signals not according to the types of sound sources but according to the structure patterns of the signals in the blocks. In this embodiment, a silence structure (silent), a single sound source structure (single), a double sound source structure (double), a sound source change structure (change), a multiple sound source change structure (multiple change), a sound source partial change structure (partial change) and an extra structure (other) are defined as structural classification patterns (categories). FIG. 4 is a schematic illustration of structural classification categories.

The silence structure pattern refers to a state where no significant sound exists in the block and the block is in a silent state 100.

The single sound source structure pattern refers to a state where only a single type of significant sound 101 exists substantially over the entire range of the block.

The double sound source structure pattern refers to a state where two types of significant sound (sound 102 and sound 103) exist substantially over the entire range of the block. It may be a state where voice sounds above BGM (background music).

The sound source change structure pattern refers to a state where the type of sound source is switched in the block. For example, voice 104 may be switched to music 105. Note that this pattern includes a change from significant sound to silence and vice versa.

The multiple sound source change structure pattern refers to a state where two sound sources are switched simultaneously in the block (e.g., two sound-sources 106 and 108 may be switched to other two sound sources 107, 109). Note that this pattern includes a change from a single sound source (or silence) to two sound sources (e.g., a single sound source 113 may be switched to two sound sources 114, 115) and a change from two sound sources to a single sound source (or silence) (e.g., two sound sources 110 and 111 may be switched to a single sound source 112). A typical example of this multiple sound source change structure pattern may be a state where both BGM and voice end almost simultaneously.

The sound source partial change structure pattern refers to a state where a single type of sound (sound 118) exists substantially over the entire range of the block and a coexisting sound is switched (e.g., sound 116 is switched to sound 117). Note that his pattern includes a change from sounds of two sound sources to a sound of a single sound source. A typical example of this sound source partial change structure may be a state where BGM continues when voice sounding above the BGM suddenly ends.

The extra structure pattern refers to a state where none of the above patterns is applicable. It may be a state where three different sounds (e.g., sounds 119, 120, 121) coexist of a state where more than two switches of sound occurs in the block (e.g., sound 122 is switched to sound 123 and then switched further to sound 124).

Now, the sound source classes that are used for the purpose of classification of audio signals in this embodiment will be described in detail.

The sound source classes refer to the classification according to the types of sound sources. As will be described hereinafter, voice, music, noise, striking sound, environmental sound and other sound are used as for the classification of sound sources.

Voice refers to human voice and may be further classified into sub-classes of male voice, female voice and other voice (infant voice, artificial voice, etc.).

Music refers to music sound and may be further classified into sub-classes of music sound of instrument, vocal music sound and other music sound (e.g., rap music sound).

Noise refers to any white noise that may be generated form machines.

Striking sound refers to the sound of knocking a door, the sound of footsteps, clapping sound (of a limited number of people) and so on that are generated by striking something. The volume of a striking sound rises abruptly immediately after the generation thereof and then attenuates. If necessary, striking sound may be further classified into sub-classes according to the sound source.

Environmental sound refers to the sound of hustle and bustle, clapping sound (of a large number of people), cheering sound, engine sound and all other sounds. If necessary, environmental sound may be further classified into sub-classes according to the sound source.

The vector quantizing section 5 of FIG. 1 performs an operation of classifying the audio signal of each block into a structural class and a sound source class, using the characteristic vector of 18 degrees.

Now, the classifying operation of the vector quantizing section 5 using the characteristic vector will be described in detail below.

Figure 5:
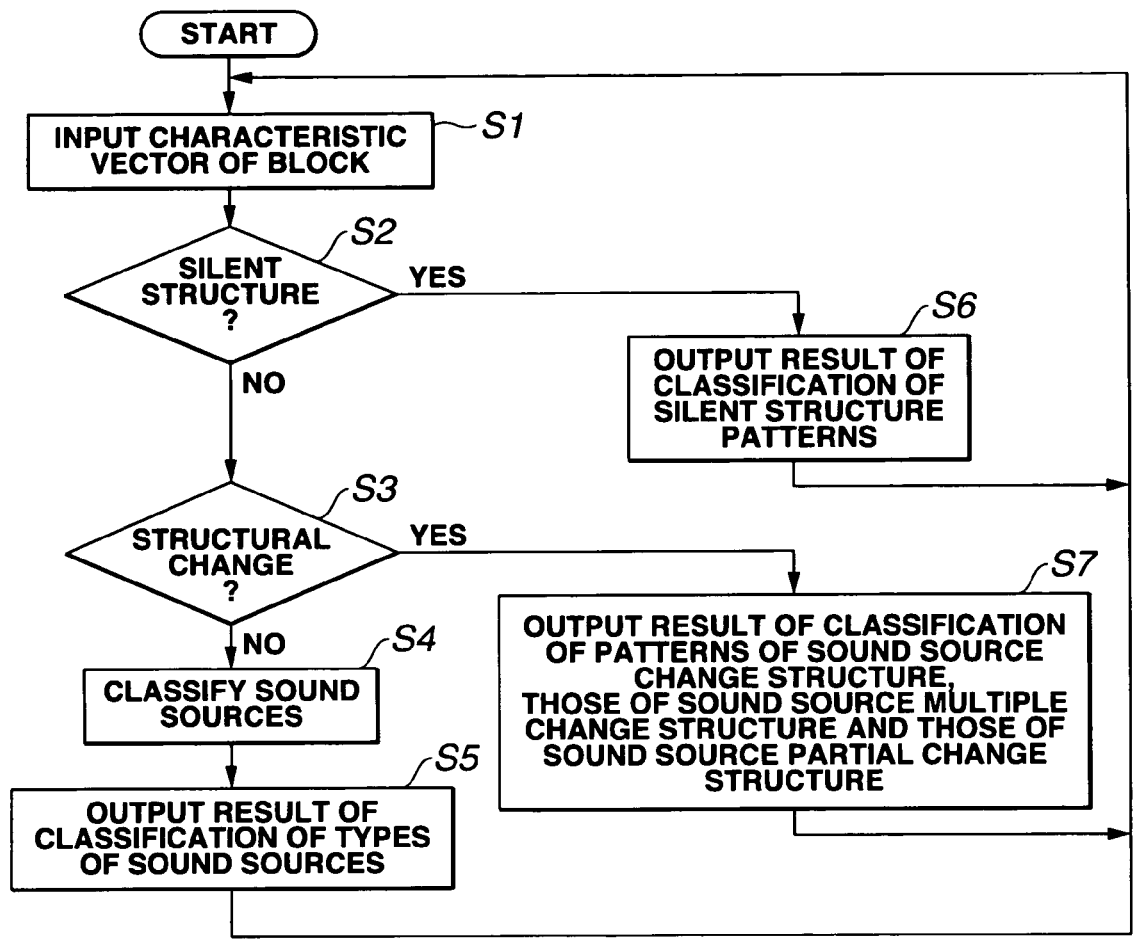
FIG. 5 is a flow chart of the processing operation conducted on each block by the vector extracting means of FIG. 1.

In this embodiment, the operation of classifying the audio signal of each block proceeds in three steps as illustrated in the flow chart of FIG. 5.

Referring to FIG. 5, upon receiving the characteristic vector $X_i$ of 18 degrees determined for the i-th block in Step S1, the vector quantizing section 5 determines in Step S2 if the audio signal of the i-th block is classified into the silence class or not. More specifically it determines if it is classified into the silence structure pattern of the structural classes or not by checking if the average $P_m$ and the standard deviation $P_{sd}$ of the signal power is below a given threshold value or not.

If it is determined in Step S2 that the audio signal of the i-th block is classified into the silence structure pattern, the vector quantizing section 5 outputs in Step S6 the result of the operation of classifying the audio signal into the silence structure pattern and returns to Step S1 for the operation of processing the audio signal of the next block. On the other hand, it is determined in Step S2 that the audio signal of the i-th block is not classified into the silence structure pattern, the vector quantizing section 5 proceeds to the processing operation of Step S3.

In Step S3, the vector quantizing section 5 carries out the processing operation for change classification. More specifically, the vector quantizing section 5 determines if the audio signal can be classified signal into any of the sound source change structure (change), the multiple sound source change structure (multiple change) and the a sound source partial change structure (partial change) or any of the single sound source structure (single), the double sound source structure (double) and the extra structure (other).

To carry out this classification, the vector quantizing section 5 firstly generates a new characteristic vector $Y_i$ by using the characteristic vector $X_{i-1}$ of the i−1-th block immediately preceding the i-th block and the characteristic vector $X_{i+1}$ of the i+1-th block immediately succeeding the i-th block. In other words, it uses formula (25) below to generate a new characteristic vector $Y_i$.

$$Y_i = (X_{i+1} - X_{i-1})/(X_{i+1} + + X_{i-1}) \quad (25)$$

Note that this operation of addition, subtraction and division is carried out for each characteristic quantity of the characteristic vector $X_{i-1}$ and that of the characteristic vector $X_{i+1}$.

After determining the new characteristic vector $Y_i$ in a manner as described above, the vector quantizing section 5 compares the new characteristic vector $Y_i$ and the VQ code book 8 it memorizes in advance. Then, it retrieves the centroid showing the closest Mahalanobis distance and finds out the category of the closest centroid (if a change structure is applicable or not in this case). If it is found in Step 3 that a change structure is applicable, the vector quantizing section 5 outputs in Step S7 the result of the classifying operation showing that the audio signal of the i-th block is classified into the sound source change structure (change), the multiple sound source change structure (multiple change) or the a sound source partial change structure (partial change) along with the reciprocal of the shortest distance to the centroid (the reliability of the structural classification) obtained by the above vector quantization. Then, the vector quantizing section 5 returns to Step S1 for the operation of processing the audio signal of the next block. If, on the other hand, it is determined in Step S3 that no change structure is applicable, the vector quantizing section 5 proceeds to the processing operation of Step S4.

In Step S4, the vector quantizing section 5 carries out an operation of source classification of classifying the audio signal into one of the non-change patterns including the single sound source structure (single), the double sound source structure (double) and the extra structure (other). Then, in Step S5, it outputs the result of the sound source classification showing if it is voice, music, noise, striking sound, environmental sound or other sound. More specifically, the vector quantizing section 5 employs a vector quantization technique and compares the characteristic vector $X_i$ of 18 degrees of the i-th block and the VQ code book 8 it memorizes in advance. Then, it retrieves the centroid showing the closest Mahalanobis distance and outputs the classification label represented by the closest centroid along with the reciprocal of the shortest distance to the centroid (the reliability of the classification of the category) as the result of classification. After the processing operation of Step S5, the vector quantizing section 5 returns to Step S1 for the operation of processing the audio signal of the next block.

Figure 6:
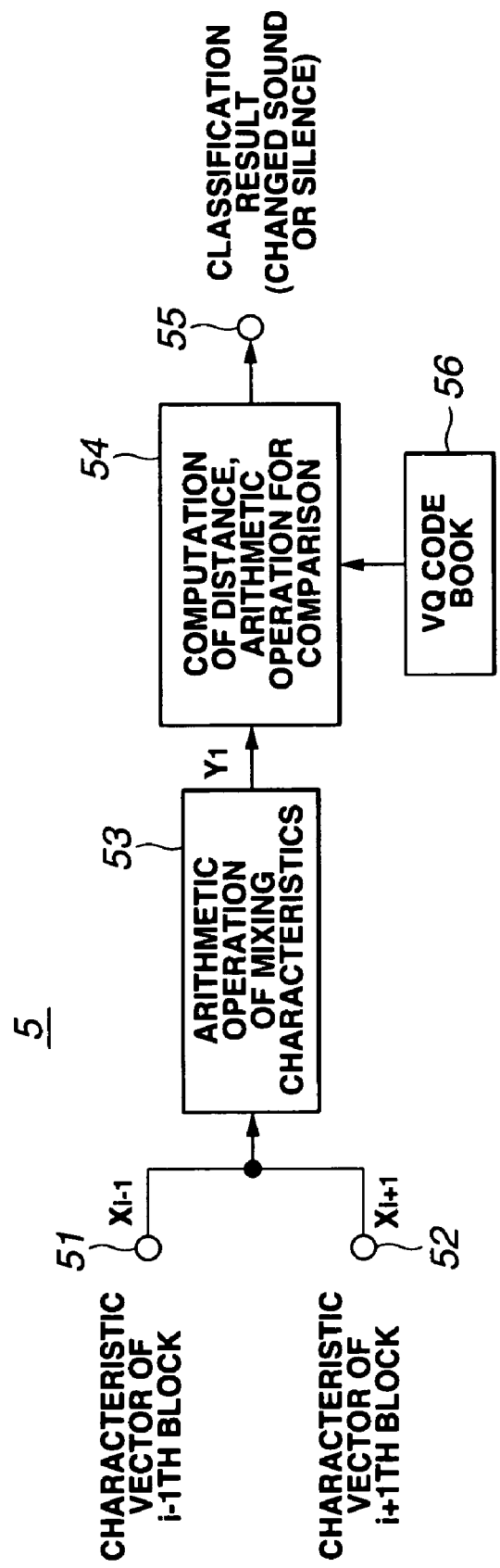
FIG. 6 is a schematic block diagram of the function of the vector quantizing means of FIG. 1 to be used when classifying the audio signal of a block as a changing sound or a non-changing sound.
Figure 7:
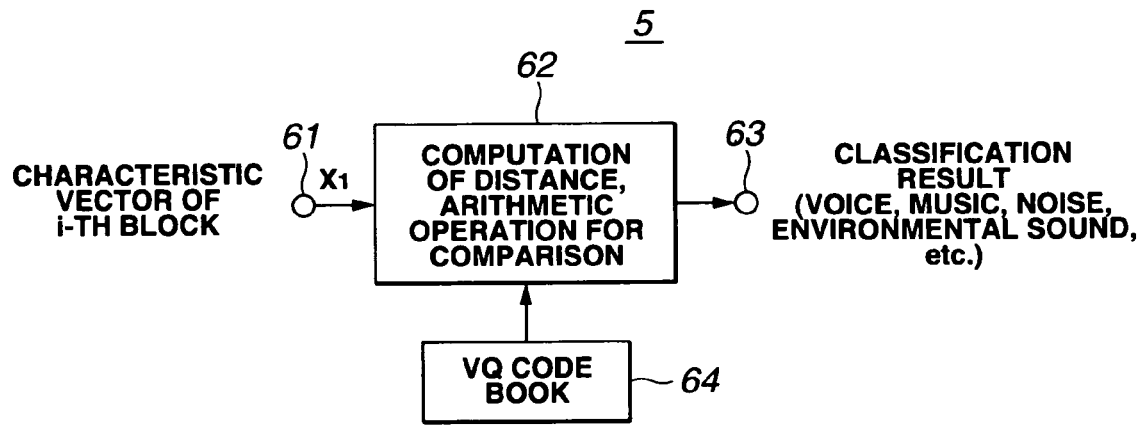

FIG. 6 is a schematic block diagram of the function to be used when the operation of Step S3 and that of Step S7 of the flow chart of FIG. 5 are carried out by the vector quantizing section 5 and the VQ code book section 8 of FIG. 1, whereas FIG. 7 is a schematic block diagram of the function to be used when the operation of Step S4 and that of Step S5 of the flow chart of FIG. 5 are carried out by the vector quantizing section 5 and the VQ code book section 8 of FIG. 1. In other words, when carrying out the operation of Step S3 and that of Step S7 of FIG. 5, the vector quantizing section 5 and the VQ code book section 8 of FIG. 1 functionally operate in a manner as illustrated in FIG. 6. On the other hand, when carrying out the operation of Step S4 and that of Step S5 of FIG. 5, the vector quantizing section 5 and the VQ code book section 8 of FIG. 1 functionally operate in a manner as illustrated in FIG. 7. While the functional operation in the vector quantizing section 5 is illustrated in two drawings of FIGS. 6 and 7 for the purpose of easy understanding, the vector quantizing section 5 is by no means functionally divided into two parts. In other words, the vector quantizing section 5 operates either in a manner as illustrated in FIG. 6 or in a manner as illustrated in FIG. 7 depending on the result of the processing operation of Step S2 and that of Step S3 of the flow chart of FIG. 5.

Referring firstly to FIG. 6, the characteristic vector $X_{i-1}$ of the i−1-th block that immediately precedes the i-th block to be classified is supplied to terminal 51 of the vector quantizing section 5, while the characteristic vector $X_{i+1}$ of the i+1-th block that immediately succeeds the i-th block is supplied to terminal 52 of the vector quantizing section 5. The characteristic vector $X_{i-1}$ of the i−1-th block and that of the characteristic vector $X_{i+1}$ of the i+1-th block are then sent to feature mixing arithmetic operation section 53 in the vector quantizing section 5.

The feature mixing arithmetic operation section 53 mixes the characteristic vector $X_{i-1}$ of the i−1-th block and the characteristic vector $X_{i+1}$ of the i+1-th block to generate a new characteristic vector $Y_i$ by using the formula (25) for mixing features. The generated new characteristic vector $Y_i$ is then sent to section 54 for computation of distance, arithmetic operation for comparison, which is a principal component of the vector quantizing section 5.

The section 54 for computation of distance, arithmetic operation for comparison compares the new characteristic vector $Y_i$ and the VQ code book 8. Then, it retrieves the centroid showing the Mahalanobis distance closest to the characteristic vector $Y_i$ and outputs the category represented by the centroid as the result of classification (changing sound or non-changing sound). The descriptor showing the result of classification is output from output terminal 55 of the vector quantizing section 5.

Referring now to FIG. 7, the characteristic vector $X_i$ of the i-th block to be classified is supplied to terminal 61 of the vector quantizing section 5. Then, the characteristic vector $X_i$ of the i-th block is sent to section 62 for computation of distance, arithmetic operation for comparison, which is also a principal component of the vector quantizing section 5.

The section 62 for computation of distance, arithmetic operation for comparison compares the characteristic vector $X_i$ and the VQ code book 8. Then, it retrieves the centroid showing the Mahalanobis distance closest to the characteristic vector $X_i$ and outputs the category represented by the centroid as the result of classification (voice, music, noise, environmental sound, etc.). The descriptor showing the result of classification is output from output terminal 63 of the vector quantizing section 5.

As described above, with the first embodiment of signal processing an apparatus according to the present invention can classify the type of the sound source and that of the structure of each of the blocks of an audio signal that is a time series signal where various sound sources show various different patterns over a long period of time and which typically represents various sounds including voices, music, environmental sounds and noises that are emitted simultaneously or continuously in an overlapping manner. Additionally, with this embodiment of signal processing an apparatus, it is now possible to identify sound segments so that they may be used for a preliminary processing operation for voice recognition and coding of acoustic signals so as to automatically select an appropriate recognition method and a coding method for any given audio signal.

Now, a second embodiment of the present invention will be described below.

When, for example, retrieving a necessary part of the stream of an accumulated long audio signal, generally, the user may listen to the stream of sound while replaying it in the fast replay mode and starts replaying it in the normal replay mode when he or she locates the start of the wanted part. However, with this retrieving technique, it will take a long time before the user can locate the wanted part of the audio signal and the user is forced to endure the tedious operation of listening to the queer sound produced as a result of the fast replay.

With the second embodiment of the present invention, the result of classification of sound change structure (particularly, the sound source change structure and the multiple sound source change structure) as described above by referring to the first embodiment is used to detect the point(s) of switch of the audio signal (to be referred to as scene change(s) hereinafter) and the normal replay operation is made to start at the time when a scene change from a silence structure to some other structure is detected in order to facilitate the retrieval of the audio signal.

Figure 8:
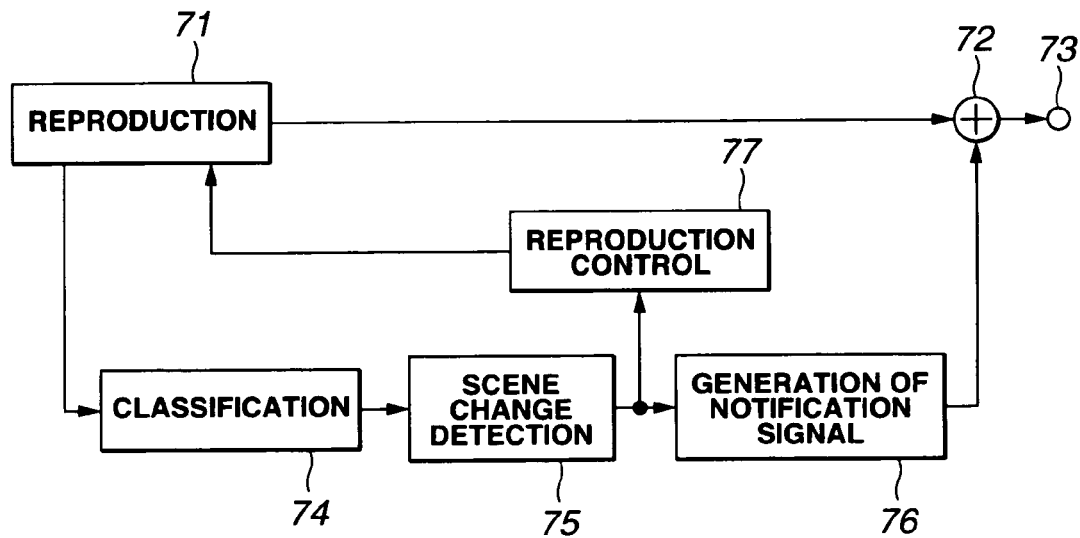
FIG. 8 is a schematic block diagram of a second embodiment of the invention, which is a signal processing an apparatus, schematically illustrating its configuration.
Figure 9:
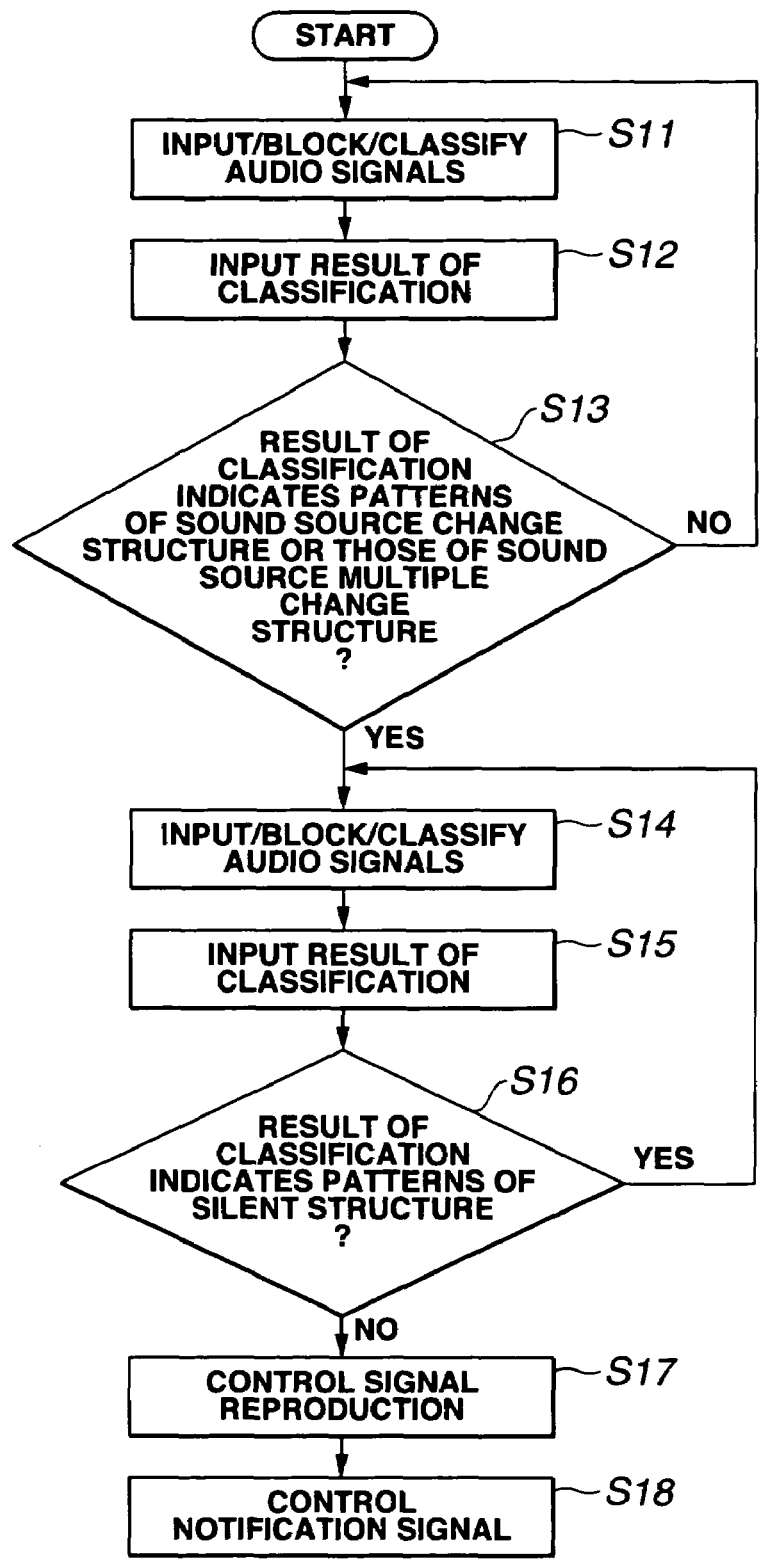
FIG. 9 is a flow chart of the processing operation conducted by the second embodiment when retrieving a desired audio signal by detecting a scene change of the audio signal.

FIG. 8 is a schematic block diagram of a second embodiment of the invention, which is a signal processing an apparatus, schematically illustrating its configuration that is adapted to use the result of classification of sound change structure (particularly, the sound source change structure and the multiple sound source change structure) obtained by means of the technique of classifying audio signals described above by referring to the first embodiment in order to facilitate the retrieval of a wanted audio signal. FIG. 9 is a flow chart of the processing operation conducted by the second embodiment when retrieving a wanted audio signal by detecting a scene change of the audio signal.

Now, the configuration and the operation of the second embodiment of signal processing an apparatus will be described by referring to FIGS. 8 and 9.

Referring firstly to FIG. 8, replay section 71 adapted to replay an audio signal from any of various different information recording media and telecommunications media and output it under the control of replay control block 77, which will be described hereinafter. When retrieving a desired audio signal by means of this second embodiment, an audio signal is output from the replay section 71 in a fast replay mode and input to classifying section 74 that operates like the first embodiment of signal processing an apparatus.

Referring to FIG. 9, the classifying section 74 carries out in Step S11 a classifying operation on the audio signal that is reproduced in the fast replay mode, using the above described techniques of blocking, characteristic extraction and vector quantization and outputs a descriptor (tag) showing the result of classification of each block. The descriptor is then sent to downstream scene change detecting section 75.

Alternatively, it is also possible for the classifying section 74 to carry out a classifying operation on the audio signal in advance and synchronously adds the descriptor to the audio signal so that the audio signal accompanied by the descriptor may be output from the replay section 71. It will be appreciated, however, that if it is so arranged that the replay section 71 outputs the audio signal accompanied by the descriptor, the classifying operation of the classifying section 74 is skipped and the descriptor is directly input to the scene change detecting section 75.

Then, upon receiving the descriptor showing the result of classification of the block from the classifying section 74 in Step S12, the scene change detecting section 75 checks in Step S13 if the audio signal shows a sound source change structure (change) or a multiple sound source change structure (multiple change) on the basis of the descriptor.

If it is determined in Step S13 that the audio signal of the block shows neither a sound source change structure (change) nor a multiple sound source change structure (multiple change), the scene change detecting section 75 outputs a signal representing the result of detection to the replay control section 77. Upon receiving the signal representing the result of detection, the replay control section 77 controls the replay section 71 so as to make it continue the replay operation in the fast replay mode. Thus, the processing operation of the embodiment returns to Step S11 and the operations of Steps S11 through 13 are repeated on the audio signal of the next block.

If, on the other hand, it is determined in Step S13 that the audio signal of the block shows either a sound source change structure or a multiple sound source change structure there, the scene change detecting section 75 outputs a signal representing the result of detection to the replay control section 77. Upon receiving the signal representing the result of detection, the replay control section 77 controls the replay section 71 so as to make it continue the replay operation in the fast replay mode. Then, the classifying section 74 carries out in Step S14 a classifying operation on the audio signal of the next block that is reproduced in the fast replay mode, using the above described techniques of blocking, characteristic extraction and vector quantization and outputs a descriptor (tag) showing the result of classification of each block.

Then, in Step S15, upon receiving the descriptor showing the result of classification of the block obtained in Step S14, the scene change detecting section 75 checks in Step S16 if the audio signal shows a silence structure (silent) or not on the basis of the descriptor.

If it is determined in Step S16 that the audio signal of the block shows a silence structure, the scene change detecting section 75 outputs a signal representing the result of detection to the replay control section 77. Upon receiving the signal representing the result of detection, the replay control section 77 controls the replay section 71 so as to make it continue the replay operation in the fast replay mode. Thus, the processing operation of the embodiment returns to Step S14 and the operations of Steps S14 through 16 are repeated on the audio signal of the next block.

If, on the other hand, it is determined in Step S16 that the audio signal of the block does not show a silence structure there, the scene change detecting section 75 outputs a signal representing the result of detection to the replay control section 77. Upon receiving the signal representing the result of detection, the replay control section 77 controls the replay section 71 so as to make it stop the replay operation in the fast replay mode and start a replay operation in the normal speed mode. Then, the audio signal reproduced by in the normal speed mode is transmitted to the loudspeaker of the display apparatus (not shown) connected to the embodiment by way of mixing section 72 and terminal 73. As a result, the sound represented by the audio signal that is reproduced in the normal speed mode is output from the loudspeaker of the display apparatus.

Thus, as it is so determined in Step S16 that the audio signal of the block does not show any silence structure there, the audio signal of the block is regarded as that of the sound of a new scene. Then, the embodiment reproduces the audio signal for the start of a new scene in the normal speed mode. Therefore, the user can recognize if the sound coming after the scene change and reproduced in the normal speed mode is the sound he or she wants or not by listening to the sound without feeling any difficulty. Additionally, as it is so determined in Step S16 that the audio signal of the block does not show any silence structure there, the signal representing the result of detection is also sent to notification signal generating section 76 from the scene change detecting section 75. Upon receiving the signal representing the result of detection, the notification signal generating section 76 generates and outputs a notification sound signal for notifying the user of the fact that a scene change is detected. The notification sound signal is then sent to the loudspeaker of the display apparatus by way of the mixing section 72 and a notification sound for notifying the detection of the scene change is output from the loudspeaker so that the user can recognize the detection of the scene change. The notification signal output form the notification signal generating section 76 may be a display signal for showing a message on the detection of a scene change on the display screen of the display apparatus. It may be appreciated that, if a display signal is output from the notification signal generating section 75 as notification signal, the signal will be transmitted not to the mixing section 72 but to the display section of the display apparatus.

As described above, with the second embodiment of signal processing an apparatus according to the invention, points of change (scene changes) of an audio signal can be detected as a result of classifying the audio signal in a manner as described earlier by referring to the first embodiment so that the point of switch of topics or that of television programs and hence multimedia data can be retrieved automatically with ease. Additionally, with the second embodiment of signal processing an apparatus according to the invention, the user now can listen only to candidate parts of signals that may show the start of the scene change he or she is looking for in the normal speed mode and detects the right one without being forced to pay efforts for tediously listening to all the sounds stored in the recording medium in the fast replay mode.

Still additionally, when used with a technique of detecting points of switch of cuts (e.g., points of switching cameras shooting scenes), the second embodiment of signal processing an apparatus according to the invention can improve the accuracy of detecting scene changes (unit scenes, or cuts, forming a visual entity).

While the first and second embodiments of the invention are described above in terms of audio signals, it may be appreciated that the present invention can also be applied to video signals and other signals for the purpose of classifying them, generating descriptors for them and retrieving them.

What is claimed is:

1. A method for classifying signals comprising:
dividing an input signal into blocks having a predetermined time length;
extracting one or more than one characteristic quantities of a signal attribute from the signal of each block; and
classifying the signal of each block into a category according to the characteristic quantities thereof, wherein said signal of each block is classified into any of the categories formed on the basis of types of signal sources, and wherein said signal of each block is classified into any of the categories formed on the basis of types structures that signals may have and do not depend on the types of signal sources, wherein
said input signal is an audio signal; and
the categories formed on the basis of structures that signals may have and do not depend on the types of signal sources for classifying the audio signal of each block include one or more than one of a silence structure where no significant sound exists in the block, a single sound source structure where only a sound related to a single sound source exists in the block, a double sound source structure where sounds related respectively to two sound sources exist in the block, a sound source change structure where a sound source including silence is switched only for one in the block, a multiple sound source change structure where a plurality of sound sources are switched simultaneously in the block, a sound source partial change structure where part of a plurality of sound sources are switched in the block and an extra structure pattern where none of the above patterns is applicable and are used for categorical classification based on the structures.

2. An apparatus for classifying signals comprising:
a blocking means for dividing an input signal into blocks having a predetermined time length;
a feature extracting means for extracting one or more than one characteristic quantities of a signal attribute from the signal of each block; and
a categorical classifying means for classifying the signal of each block into a category according to the characteristic quantities thereof, wherein said categorical classifying means classifies said signal of each block into any of the categories formed on the basis of types of signal sources, and wherein said categorical classifying means classifies said signal of each block into any of the categories formed on the basis of types of structures that signals may have and do not depend on the types of signal sources, wherein
said input signal is an audio signal; and
the categories formed on the basis of structures that signals may have and do not depend on the types of signal sources for classifying the audio signal of each block include one or more than one of a silence structure where no significant sound exists in the block, a single sound source structure where only a sound related to a single sound source exist in the block, a double sound source structure where sounds related respectively to two sound sources exist in the block, a sound source change structure where a sound source including silence is switched only for once in the block, a multiple sound source change structure where a plurality of sound sources are switched simultaneously in the block, a sound source partial change structure where part of a plurality of sound sources are switched in the block and an extra structure pattern where none of the above patterns is applicable and are used for categorical classification based on the structures.

3. A method for generating descriptors comprising:
dividing an input signal into blocks having a predetermined time length;
extracting one or more than one characteristic quantities of a signal attribute from the signal of each block;
classifying the signal of each block into a category according to the characteristic quantities thereof, wherein said signal of each block is classified into any of the categories formed on the basis of types of signal sources, and wherein said signal of each block is classified into any of the categories formed on the basis of types of structures that signals may have and do not depend on the types of signal sources; and
generating a descriptor for the signal according to the category of classification thereof, wherein
said input signal is an audio signal;
the categories formed on the basis of structures that signals may have and do no depend on the types of signal sources for classifying the audio signal of each block include one or more than one of a silence structure where no significant sound exists in the block, a single sound source structure where only a sound related to a single sound source exists in the block, a double sound source structure where sounds related respectively to two sound sources exists in the block, a sound source change structure where a sound source including silence is switched only for once in the block, a multiple sound source change structure where a plurality of sound sources are switched simultaneously in the block, a sound source partial change structure where part of a plurality of sound sources are switched in the block and an extra structure pattern where none of the above patterns is applicable and are used for categorical classification based on the structures; and
a descriptor is generating according to the categorical classification based on the structures.

4. An apparatus for generating descriptors comprising:
a blocking means for dividing an input signal into blocks having a predetermined time length;
a feature extracting means for extracting one or more than one characteristic quantities of a signal attribute from the signal of each block;
a categorical classifying means for classifying the signal of each block into a category according to the characteristic quantities thereof, wherein said categorical classifying means classifies said signal of each block into any of the categories formed on the basis of types of signal sources, and wherein said categorical classifying means classifies said signal of each block into any of the categories formed on the basis of types of structures that signals may have and do not depend on the types of signal sources; and
a descriptor generating means for generating a descriptor for the signal according to the category of classification thereof, wherein
said input signal is an audio signal;
the categories formed on the basis of structures that signals may have and do not depend on the types of signal sources for classifying the audio signal of each block include one or more than one of a silence structure where no significant sound exists in the block, a single sound source structure where only a sound related to a single sound source exists in the block, a double sound source structure where sounds related respectively to two sound sources exist in the block, a sound source change structure where a sound source including silence is switched only for once in the block, a multiple sound source change structure where a plurality of sound sources are switched simultaneously in the block, a sound source partial change structure where part of a plurality of sound sources are switched in the block and an extra structure pattern where none of the above patterns is applicable and are used for categorical classification based on the structures; and
said descriptor generating means generates a descriptor according to the categorical classification based on the structures.

5. A method for retrieving signals comprising:
dividing an input signal into blocks having a predetermined time length;
extracting one or more than one characteristic quantities of a signal attribute from the signal of each block;
classifying the signal of each block into a category according to the characteristic quantities thereof, wherein said signal of each block is classified into any of the categories formed on the basis of types of signal sources, and wherein said signal of each block is classified into any of the categories formed on the basis of types of structures that signals may have and do not depend on the types of signal sources; and
retrieving the signal according to the result of categorical classification or by using a descriptor generated according to the result of categorical classification, wherein
said input signal is an audio signal;
the categories formed on the basis of structures that signals may have and do not depend on the types of signal sources for classifying the audio signal of each block include one or more than one of a silence structure where no significant sound exists in the block, a single sound source structure where only a sound related to a single sound source exists in the block, a double sound source structure where sounds related respectively to two sound sources exist in the block, a sound source change structure where a sound source including silence is switched only for once in the block, a multiple sound source change structure where a plurality of sound sources are switched simultaneously in the block, a sound source partial change structure where part of a plurality of sound sources are switched in the block and an extra structure pattern where none of the above patterns is applicable and are used for categorical classification based on the structures; and
a signal is retrieved by using the descriptor reflecting or corresponding to the result of said categorical classification based on the structure.

6. An apparatus for retrieving signals comprising:
a blocking means for dividing an input signal into blocks having a predetermined time length;
a feature extracting means for extracting one or more than one characteristic quantities of a signal attribute from the signal of each block;
a categorical classifying means for classifying the signal of each block into a category according to the characteristic quantities thereof, wherein said categorical classifying means classifies said signal of each block into any of the categories formed on the basis of types of signal sources, and wherein said categorical classifying means classifies said signal of each block into any of the categories formed on the basis of types of structures that signals may have and do not depend on the types of signal sources; and a signal retrieving means for retrieving the signal according to the result of categorical classification or by using a descriptor generated according to the result of categorical classification, wherein said input signal is an audio signal;

the categories formed on the basis of structures that signals may have and do not depend on the types of signal sources for classifying the audio signal of each block include one or more than one of a silence structure where no significant sound exists in the block, a single sound source structure where only a sound related to a single sound source exists in the block, a double sound source structure where sounds related respectively to two sound sources exist in the block, a sound source change structure where a sound source including silence is switched only for once in the block, a multiple sound source change structure where a plurality of sound sources are switched simultaneously in the block, a sound source partial change structure where part of a plurality of sound sources are switched in the bock and an extra structure pattern where none of the above patterns is applicable and are used for categorical classification based on the structures; and said signal retrieving means retrieves a signal by using the descriptor reflecting or corresponding to the result of said categorical classification based on the structure.

* * * * *